United States Patent
Munteshari

(10) Patent No.: US 12,451,537 B1
(45) Date of Patent: Oct. 21, 2025

(54) MULTI-MODE COOLING SYSTEM FOR BATTERIES

(71) Applicant: King Fahd University of Petroleum and Minerals, Dhahran (SA)

(72) Inventor: Obaidallah Mohammad Ali Munteshari, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/206,151

(22) Filed: May 13, 2025

(51) Int. Cl.
| | |
|---|---|
| *H01M 10/63* | (2014.01) |
| *B60L 58/26* | (2019.01) |
| *H01M 10/613* | (2014.01) |
| *H01M 10/625* | (2014.01) |
| *H01M 10/6563* | (2014.01) |
| *H01M 10/6569* | (2014.01) |

(Continued)

(52) U.S. Cl.
CPC ............ *H01M 10/63* (2015.04); *B60L 58/26* (2019.02); *H01M 10/613* (2015.04); *H01M 10/625* (2015.04); *H01M 10/6563* (2015.04); *H01M 10/6569* (2015.04); *H01M 10/663* (2015.04); *H01M 50/249* (2021.01); *B60L 2240/545* (2013.01)

(58) Field of Classification Search
CPC .. H01M 10/63; H01M 10/613; H01M 10/625; H01M 10/6563; H01M 10/6569; H01M 10/663; H01M 50/249; B60L 58/26; B60L 2240/545
See application file for complete search history.

(56) References Cited

U.S. PATENT DOCUMENTS

2023/0158908 A1 5/2023 Hou et al.

FOREIGN PATENT DOCUMENTS

| CN | 209592252 U | 11/2019 |
|---|---|---|
| CN | 108376808 B | 7/2020 |

(Continued)

OTHER PUBLICATIONS

Rahman Ataur, et al., "Two-phase evaporative battery thermal management technology for EVs/HEVs," International Journal of Automotive Technology, vol. 18, 2017, pp. 875-882, 8 Pages.

(Continued)

*Primary Examiner* — Lingwen R Zeng
(74) *Attorney, Agent, or Firm* — Oblon, McClelland, Maier &Neustadt, L.L.P.

(57) ABSTRACT

A multi-mode cooling system includes a first three-way valve, an evaporative cooler, a battery pack chamber with slots for battery main bodies, a second three-way valve, a dehumidifier, and a battery tab chamber with slots for battery tabs. The system operates in closed-circuit mode during vehicle operation, where cool air from the evaporative cooler flows through the battery pack chamber, dehumidifier, and battery tab chamber before returning to the evaporative cooler, creating a closed loop with water recycling. In open-circuit mode during vehicle parking, ambient air flows through the evaporative cooler and battery pack chamber before being discharged to the environment, providing energy-efficient cooling. The system maintains battery temperatures within operational ranges during both driving and parking, featuring a water level control system that maintains constant water levels in the dehumidifier without sensors or active control, and a shared thermal structure between the dehumidifier and evaporative cooler.

20 Claims, 11 Drawing Sheets

(51) Int. Cl.
   *H01M 10/663*   (2014.01)
   *H01M 50/249*   (2021.01)

(56) References Cited

FOREIGN PATENT DOCUMENTS

KR   10-2016-0040333 A   4/2016
KR       10-2574693 B1   9/2023

OTHER PUBLICATIONS

Obaidallah Munteshari, "Hybrid Evaporative Cooling System for EV's Batteries", ASTFE Digital Library. Begel House Inc., 2025 and the 10th Thermal and Fluids Engineering Conference on Mar. 14, 2025, 9 Pages.

MULTI-MODE COOLING SYSTEM FOR BATTERIES

STATEMENT REGARDING PRIOR DISCLOSURE BY THE INVENTORS

Aspects of the present disclosure are presented in Obaidallah Munteshari, "HYBRID EVAPORATIVE COOLING SYSTEM FOR EV'S BATTERIES" ASTFE Digital Library. Begel House Inc., 2025 and the 10th Thermal and Fluids Engineering Conference on Mar. 14, 2025.

STATEMENT OF ACKNOWLEDGEMENT

The inventors appreciate the support provided by the Deanship of Research at King Fahd University of Petroleum and Minerals (KFUPM).

BACKGROUND

Technical Field

The present disclosure is directed to thermal management systems for batteries, and more particularly to a hybrid evaporative cooling system for regulating temperatures of lithium-ion batteries used in electric vehicles under various operating conditions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The transportation sector is responsible for a significant portion of global greenhouse gas emissions. Therefore, a transition toward emission-free transportation alternatives, including electric vehicles, is desirable. Electric vehicles are powered by electrical energy stored in batteries. Lithium-ion batteries have become the dominant choice for powering electric vehicles due to their superior performance characteristics including high energy density, long life, and high voltage. Despite their numerous advantages, several issues continue to limit their rapid expansion in the electric vehicle market. One of these critical issues is the rise in temperature due to internal and external factors.

Numerous studies have examined the influence of operating temperature on battery performance during charging and discharging cycles. While lithium-ion batteries can generally function at temperatures as low as −20° C. and as high as 60° C., maintaining safety and performance necessitates a more restricted temperature range. To ensure reliable operation and prevent potential hazards, lithium-ion batteries are typically recommended to operate between 20° C. and 40° C. The thermal behavior of lithium-ion batteries is influenced by both external and internal factors. External conditions, such as ambient temperature, can contribute to elevated temperatures. Internally, irreversible and reversible heat generation during charging and discharging processes are also contributors. Excessive temperature rise can lead to capacity degradation, increased internal resistance, and ultimately, compromised battery performance. In severe cases, thermal runaway and potential fires can occur.

To address these concerns, electric vehicles incorporate thermal management systems to regulate lithium-ion battery temperatures. Battery thermal management systems can be broadly classified into air cooling, liquid cooling, phase change materials, heat pipes, and combinations thereof. Air cooling, while simple and cost-effective, is suitable for batteries with lower capacities and moderate heat generation. For larger capacity batteries, liquid cooling systems offer superior cooling capabilities, gaining widespread adoption in high-performance electric vehicles. As battery capacities continue to grow, phase-change materials and heat pipes have emerged as advanced thermal management technologies. Phase-change materials utilize their latent heat to absorb battery heat, but their low thermal conductivity, particularly in traditional materials such as paraffin wax, can be limiting. Researchers have explored methods to enhance phase-change material thermal conductivity using composite materials.

During vehicle operation, battery thermal management systems typically maintain battery temperatures within a suitable range, aided by the air conditioning system that cools the cabin and other vehicle components. However, during parked conditions, batteries are exposed to a wider temperature range due to sun radiation and ambient temperature. In regions with extreme climate conditions, outdoor temperatures can soar to 50° C. or higher in summer. Additionally, under direct sunlight, the interior temperature of a parked vehicle can easily exceed 70° C. To effectively deploy electric vehicles in such environments, it is required to design battery thermal management systems that can operate in a semi-passive manner, consuming little energy while mitigating the effects of elevated and fluctuating ambient temperatures. Conventional battery thermal management systems often fail to address this challenge, as they typically rely on active cooling mechanisms that consume significant battery power, which is not sustainable during extended parking periods.

KR1020160040333A describes an upstream-side evaporation cooling unit installed in the air channel between a cooling device and a pre-humidification unit. The direct evaporator includes a dry channel through which air passes and a wet channel through which water is injected, configured to allow the passing air to cool and humidify.

CN108376808B describes a system including a first circulation line with components such as a condenser, an air conditioning compressor, an evaporator, expansion valves, and a fan. The system also includes a second circulation line with a water pump, water temperature sensor, heater, and radiator tank for battery thermal management.

US20230158908A1 describes a refrigerant amount monitoring and charging control system. The system includes a chiller with an electronic expansion valve and an evaporator connected to a compressor and a condenser through a refrigerant conduit for thermal management.

Ataur et al. ("Two-phase evaporative battery thermal management technology for EVs/HEVs") describe an evaporative cooling battery thermal management system having cooling ducts, a compressor, a condenser, an expansion valve and a set of thermocouples. The study focuses on the application of evaporative cooling for battery thermal management in electric and hybrid vehicles.

Each of the aforementioned references suffers from one or more drawbacks hindering their adoption, such as excessive energy consumption during stationary periods, inability to adapt to different operational conditions, reliance on constant power supply for cooling functionality, limited effectiveness in extreme environmental conditions, and lack of comprehensive temperature management for both battery cells and terminals. Accordingly, it is one object of the present disclosure to provide an adaptable cooling system for electric vehicle batteries that can efficiently operate in different modes to address varying cooling requirements during both active vehicle operation and passive parking conditions, while reducing energy consumption and maintaining battery temperatures within operational ranges.

SUMMARY

In an exemplary embodiment, a multi-mode cooling system includes a first three-way valve having a first inlet configured to receive a refrigerant including air from a surrounding environment; an evaporative cooler; a battery pack chamber having slots that extend through the battery pack chamber and are configured to receive main bodies of batteries; a second three-way valve; a dehumidifier; and a battery tab chamber having slots that extend through the battery tab chamber and are configured to receive tabs of the batteries. The first three-way valve and the second three-way valve are configured such that the multi-mode cooling system has a closed-circuit mode and an open-circuit mode. In the closed-circuit mode, the evaporative cooler is configured to generate a first cool air, the battery pack chamber is configured to receive the first cool air to provide cooling for the main bodies of the batteries and generate a first warm air, the dehumidifier is configured to receive the first warm air and generate a second cool air, the battery tab chamber is configured to receive the second cool air to provide cooling for the tabs of the batteries and generate a second warm air, and the evaporative cooler is configured to receive the second warm air to generate the first cool air. In the open-circuit mode, the evaporative cooler is configured to receive the air and generate a first cool air, the battery pack chamber is configured to receive the first cool air to provide cooling for the main bodies of the batteries and generate the first warm air to be discharged into the surrounding environment.

In some embodiments, an inlet of the evaporative cooler is fluidly connected to an outlet of the first three-way valve, an inlet of the battery pack chamber is fluidly connected to an outlet of the evaporative cooler, an inlet of the second three-way valve is fluidly connected to an outlet of the battery pack chamber, an inlet of the dehumidifier is fluidly connected to a first outlet of the second three-way valve, an inlet of the battery tab chamber is fluidly connected to an outlet of the dehumidifier, a second inlet of the first three-way valve is fluidly connected to an outlet of the battery tab chamber, and a second outlet of the second three-way valve is fluidly connected to the surrounding environment.

In some embodiments, the evaporative cooler is configured to receive the second warm air from the battery tab chamber via the first three-way valve when the second inlet of the first three-way valve is open, and the dehumidifier is configured to receive the first warm air from the battery pack chamber via the second three-way valve when the first outlet of the second three-way valve is open.

In some embodiments, in the closed-circuit mode, the first three-way valve, the evaporative cooler, the battery pack chamber, the second three-way valve, the dehumidifier and the battery tab chamber are configured to define a closed circuit for the refrigerant to circulate therein, when the first inlet of the first three-way valve is closed, the second inlet of the first three-way valve is open, the outlet of the first three-way valve is open, the inlet of the second three-way valve is open, the first outlet of the second three-way valve is open, and the second outlet of the second three-way valve is closed.

In some embodiments, the evaporative cooler is configured to receive the air from the surrounding environment via the first three-way valve when the first inlet of the first three-way valve is open, and the battery pack chamber is configured to discharge the first warm air into the surrounding environment via the second three-way valve when the second outlet of the second three-way valve is open.

In some embodiments, in the open-circuit mode, the first three-way valve, the evaporative cooler, the battery pack chamber and the second three-way valve are configured to define an open circuit for the refrigerant to pass through when the first inlet of the first three-way valve is open, the second inlet of the first three-way valve is closed, the outlet of the first three-way valve is open, the inlet of the second three-way valve is open, the first outlet of the second three-way valve is closed, and the second outlet of the second three-way valve is open.

In some embodiments, the dehumidifier includes a dehumidifying chamber configured to hold a volume of water and receive the first warm air from the battery pack chamber via the second three-way valve, the first warm air including moisture; and a coolant line immersed at least partially in the volume of water and defining a flow path for a coolant to cool the first warm air and condense the moisture.

In some embodiments, the multi-mode cooling system further includes a conduit connecting the evaporative cooler and the dehumidifier and configured to transfer a portion of the volume of water from the dehumidifier to the evaporative cooler.

In some embodiments, the conduit includes an outlet connected to the evaporative cooler, an inlet manifold, and a plurality of pipes extending from the inlet manifold, the dehumidifier further includes a plurality of holes aligned in a vertical direction of a sidewall structure of the dehumidifying chamber, and each pipe of the conduit is connected to a respective hole of the dehumidifier.

In some embodiments, the inlet manifold is configured so that a selected hole of the plurality of holes defines a highest level of the volume of water on the sidewall structure of the dehumidifying chamber and maintains a substantially constant amount of water in the dehumidifier over time.

In some embodiments, the evaporative cooler includes an evaporative cooling chamber, and a bottom structure of the dehumidifying chamber forms a top structure of the evaporative cooling chamber.

In some embodiments, the evaporative cooler includes a water reservoir configured to hold water; an evaporative pad positioned above the water reservoir; a water line configured to provide a portion of the water for the evaporative pad from the water reservoir; and a fan configured to move the air from one side of the evaporative pad to another side of the evaporative pad.

In some embodiments, the water line has a first end immersed in the water reservoir and a second end positioned above the water reservoir, and the evaporative cooler further includes a pump configured to move the portion of the water from the first end to the second end.

In some embodiments, each of the slots of the battery pack chamber is aligned with a respective one of the slots of the battery tab chamber.

In some embodiments, the batteries are lithium-ion batteries of a vehicle.

In some embodiments, the dehumidifier is a bubble column dehumidifier connected to an air conditioning of the vehicle.

In some embodiments, the multi-mode cooling system further includes a controller configured to switch on the closed-circuit mode of the multi-mode cooling system by closing the first inlet of the first three-way valve and the second outlet of the second three-way valve and opening the second inlet of the first three-way valve, the outlet of the first three-way valve, the inlet of the second three-way valve and the first outlet of the second three-way valve.

In some embodiments, the controller is configured to switch on the closed-circuit mode of the multi-mode cooling system when a vehicle including the multi-mode cooling system is in operation.

In some embodiments, the multi-mode cooling system further includes a controller configured to switch on the open-circuit mode by closing the second inlet of the first three-way valve and the first outlet of the second three-way valve and opening the first inlet of the first three-way valve, the outlet of the first three-way valve, the inlet of the second three-way valve and the second outlet of the second three-way valve.

In some embodiments, the controller is configured to switch on the open-circuit mode of the multi-mode cooling system when a vehicle including the multi-mode cooling system is at rest.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
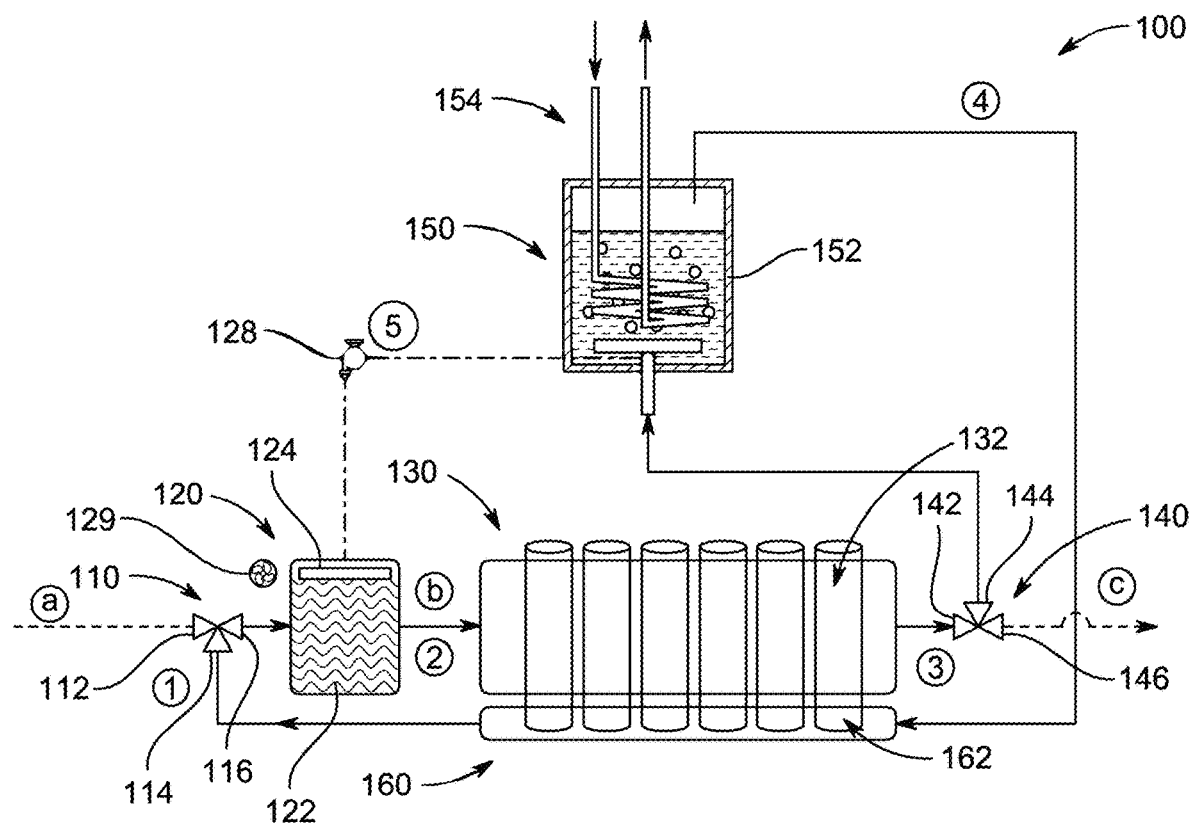
FIG. 1 is a schematic diagram of a multi-mode cooling system for batteries, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a multi-mode cooling system for electric vehicle batteries that provides effective temperature regulation under diverse operating conditions. The multi-mode cooling system utilizes selective air circulation paths to maintain battery temperatures within acceptable limits, employing evaporative cooling techniques for enhanced efficiency. The multi-mode cooling system incorporates valve-controlled air routing to enable different operational modes depending on vehicle status, ambient conditions, and cooling requirements. The multi-mode cooling system enables effective heat dissipation from both the main bodies and terminal connections of battery cells, ensuring uniform temperature distribution and improved battery performance. The multi-mode cooling system of the present disclosure addresses the distinct thermal management challenges associated with both active driving and passive parking scenarios, through the implementation of mode-specific cooling strategies.

Referring to FIG. 1, illustrated is a schematic of a multi-mode cooling system (as represented by reference numeral 100). The multi-mode cooling system 100 of the present disclosure integrates multiple cooling technologies into a unified architecture to provide thermal management for electric vehicle batteries with reduced energy consumption. The multi-mode cooling system 100 employs configurable air flow circuits that can be adjusted based on real-time requirements, providing flexibility not available in conventional single-mode cooling approaches. The multi-mode cooling system 100 leverages the high cooling efficiency of water evaporation by combining direct evaporative cooling with dehumidification capabilities, while managing humidity levels to prevent potential moisture-related issues. The multi-mode cooling system 100 maintains a balanced approach to water and energy usage, with closed-circuit operation reducing water consumption during active driving and open-circuit operation reducing energy requirements during parking. Through its adaptable operation, the multi-mode cooling system 100 extends battery lifespan by preventing temperature-related degradation while contributing to overall vehicle performance by reducing parasitic energy consumption associated with battery thermal management.

As illustrated in FIG. 1, the multi-mode cooling system 100 includes a first three-way valve 110, an evaporative cooler 120, a battery pack chamber 130, a second three-way valve 140, a dehumidifier 150, and a battery tab chamber 160. The multi-mode cooling system 100 is designed to operate in at least two distinct modes: a closed-circuit mode and an open-circuit mode. This dual-mode capability enables the multi-mode cooling system 100 to adapt to different operating conditions and efficiently cool the electric vehicle batteries without excessive energy consumption.

In the multi-mode cooling system 100, the first three-way valve 110 has a first inlet 112 configured to receive a refrigerant including air from a surrounding environment. The first three-way valve 110 also includes a second inlet 114 and an outlet 116. The first three-way valve 110 is capable of selectively directing flow between its inlets and outlet, enabling switching between the closed-circuit mode and the open-circuit mode of the multi-mode cooling system 100. The first three-way valve 110 can be electronically controlled to adjust the flow paths based on the operational mode of the multi-mode cooling system 100. The operation of the first three-way valve 110 may be controlled to regulate the source of air for the cooling process, from the surrounding environment or from within the closed circuit.

The evaporative cooler 120 is configured to generate a first cool air by utilizing the principles of evaporative cooling. The evaporative cooler 120 receives air from the first three-way valve 110 and processes it to reduce its temperature through water evaporation. The evaporative cooler 120 includes a water reservoir 122 configured to hold water for the evaporative cooling process. The evaporative cooler 120 also includes an evaporative pad 124 positioned above the water reservoir 122, which facilitates the evaporation of water into the passing air. The evaporative cooling process involves the transfer of heat from the air to the water, resulting in a reduction of air temperature and an increase in humidity. This cooled air is then directed through the multi-mode cooling system 100 for battery cooling purposes.

The evaporative cooler 120 also includes a water line 126 configured to provide a portion of the water for the evaporative pad 124 from the water reservoir 122. The water line 126 ensures continuous supply of water to the evaporative pad 124, maintaining the efficiency of the cooling process. The water line 126 has a first end immersed in the water reservoir 122 and a second end positioned above the water reservoir 122. The evaporative cooler 120 further includes a pump 128 configured to move the portion of the water from the first end of the water line 126 to the second end, ensuring a consistent flow of water to the evaporative pad 124 regardless of the system orientation or motion of the vehicle. The pump 128 can be electrically powered and its operation can be synchronized with the overall functioning of the multi-mode cooling system 100.

The evaporative cooler 120 further includes a fan 129 configured to move the air from one side of the evaporative pad 124 to another side of the evaporative pad 124. The fan 129 ensures a consistent airflow through the evaporative pad 124, enhancing the evaporative cooling effect. The fan 129 can operate at various speeds to adjust the cooling capacity of the evaporative cooler 120 based on the cooling demands. The fan 129 may be configured for both operational modes of the multi-mode cooling system 100, facilitating air circulation through the multi-mode cooling system 100.

Further, in the multi-mode cooling system 100, the battery pack chamber 130 has slots 132 that extend through the battery pack chamber 130 and are configured to receive main bodies of batteries. The battery pack chamber 130 is designed to house the batteries of the vehicle. In present configurations, the batteries are lithium-ion batteries of the vehicle. The lithium-ion batteries while allowing air to flow around them for cooling purposes. The slots 132 are designed so that the batteries are tightly fitted into the slots 132 to ensure direct contact between the slots 132 and the batteries as well as prevent battery slippage along the slots 132. The battery pack chamber 130 is configured to receive the first cool air from the evaporative cooler 120 to provide cooling for the main bodies of the batteries and generate a first warm air as the cool air absorbs heat from the batteries. The battery pack chamber 130 is positioned such that it facilitates airflow around the batteries while maintaining structural support for the battery pack.

The second three-way valve 140 includes an inlet 142, a first outlet 144, and a second outlet 146. The second three-way valve 140, similar to the first three-way valve 110, is capable of selectively directing flow between its inlet and outlets, facilitating the switch between the closed-circuit mode and the open-circuit mode of the multi-mode cooling system 100. The second three-way valve 140 can also be electronically controlled to adjust the flow paths based on the operational mode of the multi-mode cooling system 100. The second three-way valve 140 receives the first warm air from the battery pack chamber 130 and directs it to the dehumidifier 150 via the first outlet 144 in the closed-circuit mode or to the surrounding environment via the second outlet 146 in the open-circuit mode. The inlet 142 of the second three-way valve 140 is fluidly connected to an outlet 134 of the battery pack chamber 130.

The dehumidifier 150 is configured to receive the first warm air from the battery pack chamber 130 via the second three-way valve 140 when the first outlet 144 is open and generate a second cool air. The dehumidifier 150 removes moisture from the first warm air and reduces its temperature, preparing it for further cooling applications within the multi-mode cooling system 100. The dehumidifier 150 includes a dehumidifying chamber 152 configured to hold a volume of water and receive the first warm air from the battery pack chamber 130 via the second three-way valve 140, with the first warm air including moisture. The dehumidifier 150 also includes a coolant line 154 immersed at least partially in the volume of water and defining a flow path for a coolant to cool the first warm air and condense the moisture. The dehumidifier 150 plays an important role in the closed-circuit mode, ensuring that the air circulating through the system does not become excessively humid, which could reduce cooling efficiency.

The dehumidifier 150, in certain embodiments, is a bubble column dehumidifier connected to an air conditioning system of the vehicle. The bubble column design enhances the interaction between the warm, humid air and the coolant, improving the efficiency of the dehumidification process. The connection to the air conditioning system of the vehicle allows the dehumidifier 150 to use the existing cooling infrastructure, reducing the overall system complexity and energy consumption. The dehumidifier 150 ensures that the moisture removed from the air during the cooling process is captured and can be reused within the evaporative cooler 120, creating a closed water cycle that reduces water consumption in the closed-circuit mode.

Furthermore, in the multi-mode cooling system 100, the battery tab chamber 160 has slots 162 that extend through the battery tab chamber 160 and are configured to receive tabs of the batteries. The slots 162 are designed so that the batteries are tightly fitted into the slots 162 to ensure direct contact between the slots 162 and the batteries as well as prevent battery slippage along the slots 162. Each of the slots 162 of the battery tab chamber 160 is aligned with a respective one of the slots 132 of the battery pack chamber 130 to accommodate a respective battery. The battery tab chamber 160 is configured to receive the second cool air from the dehumidifier 150 to provide cooling for the tabs of the batteries and generate a second warm air as the cool air absorbs heat from the battery tabs. The battery tab chamber 160 is designed to effectively cool the battery tabs, which are often hotspots due to their role in current conduction in the batteries. The cooling of both the battery main bodies and the tabs of the batteries by the multi-mode cooling system 100 ensures more uniform temperature distribution across the entire battery, enhancing overall battery performance and lifespan.

In the multi-mode cooling system 100, the first three-way valve 110 and the second three-way valve 140 are configured such that the multi-mode cooling system 100 has a closed-circuit mode and an open-circuit mode. The valves 110, 140 are positioned and connected within the multi-mode cooling system 100 to enable switching between these two operational modes. The valve configurations determine the flow paths of the air through the multi-mode cooling system 100, directing it in a closed loop or in an open path from the environment and back. The ability to switch between these modes allows the multi-mode cooling system 100 to adapt to different operating conditions, providing efficient cooling while reducing energy consumption. The control of these valves 110, 140 can be automated based on vehicle operation status, battery temperature, ambient conditions, and/or other relevant parameters.

In the closed-circuit mode, the multi-mode cooling system 100 operates as a closed loop in which the refrigerant, including primarily air or consisting of air, circulates continuously through the system components. In the closed loop mode, the first inlet 112 of the first three-way valve 110 is closed, the second inlet 114 of the first three-way valve 110 is open, the outlet 116 of the first three-way valve 110 is open, the inlet 142 of the second three-way valve 140 is open, the first outlet 144 of the second three-way valve 140 is open, and the second outlet 146 of the second three-way valve 140 is closed. As a result, the first three-way valve 110, the evaporative cooler 120, the battery pack chamber 130, the second three-way valve 140, the dehumidifier 150 and the battery tab chamber 160 are configured to define a closed circuit for the refrigerant to circulate therein. In the closed loop mode, the evaporative cooler 120 is configured to generate the first cool air by utilizing water evaporation to reduce the temperature of the circulating air. The battery pack chamber 130 is configured to receive the first cool air to provide cooling for the main bodies of the batteries and generate the first warm air as the cool air absorbs heat from the batteries. The dehumidifier 150 is configured to receive the first warm air and generate the second cool air by removing moisture and heat from the air. The battery tab chamber 160 is configured to receive the second cool air to provide cooling for the tabs of the batteries and generate the second warm air. The evaporative cooler 120 is configured to receive the second warm air to generate the first cool air, completing the closed circuit. This continuous circulation allows for efficient cooling of the batteries without significant water consumption, as the water evaporated in the evaporative cooler 120 is recaptured in the dehumidifier 150.

In the open-circuit mode, the multi-mode cooling system 100 operates as an open path in which fresh air from the surrounding environment is processed for cooling and then discharged back to the environment after use. In the open-circuit mode, the first inlet 112 of the first three-way valve 110 is open, the second inlet 114 of the first three-way valve 110 is closed, the outlet 116 of the first three-way valve 110 is open, the inlet 142 of the second three-way valve 140 is open, the first outlet 144 of the second three-way valve 140 is closed, and the second outlet 146 of the second three-way valve 140 is open. As a result, the first three-way valve 110, the evaporative cooler 120, the battery pack chamber 130 and the second three-way valve 140 are configured to define an open circuit for the refrigerant to pass through. In the open-circuit mode, the evaporative cooler 120 is configured to receive the air from the surrounding environment via the first three-way valve 110 and generate the first cool air through evaporative cooling. The battery pack chamber 130 is configured to receive the first cool air to provide cooling for the main bodies of the batteries and generate the first warm air as the cool air absorbs heat from the batteries. This first warm air is then discharged into the surrounding environment via the second three-way valve 140, completing the open circuit. The open-circuit mode is particularly useful during parking conditions, where the air conditioning system of the vehicle is not operational, and a simple yet effective cooling mechanism is needed to maintain battery temperatures within acceptable limits. This mode consumes water for the evaporative cooling process but requires little or no electrical energy, making it suitable for extended parking periods.

The design of the multi-mode cooling system 100 enables it to operate efficiently in both modes, providing flexible cooling solutions for different operating conditions of the electric vehicle. The closed-circuit mode is typically used during active driving, when the air conditioning system of the vehicle is operational and can provide cooling for the dehumidifier 150. The open-circuit mode is more suitable for parking conditions, when the vehicle is not active, and energy conservation is a priority. The components of the multi-mode cooling system 100 are arranged and connected to facilitate efficient operation in both modes, ensuring continuous and effective battery cooling regardless of operational status of the vehicle. The proposed multi-mode approach addresses the diverse cooling needs of electric vehicle batteries throughout their operational cycle, enhancing overall battery performance and lifespan.

Specifically within the multi-mode cooling system 100, as illustrated in FIG. 1, an inlet of the evaporative cooler 120 is fluidly connected to an outlet 116 of the first three-way valve 110. This connection allows the evaporative cooler 120 to receive air from the surrounding environment via the first inlet 112 of the first three-way valve 110 or from the battery tab chamber 160 via the second inlet 114 of the first three-way valve 110, depending on the operational mode of the multi-mode cooling system 100. An inlet of the battery pack chamber 130 is fluidly connected to an outlet of the evaporative cooler 120, enabling the cooled air from the evaporative cooler 120 to flow directly into the battery pack chamber 130 for cooling the main bodies of the batteries. The inlet 142 of the second three-way valve 140 is fluidly connected to the outlet 134 of the battery pack chamber 130, allowing the first warm air generated in the battery pack chamber 130 to be directed by the second three-way valve 140.

Further, an inlet of the dehumidifier 150 is fluidly connected to the first outlet 144 of the second three-way valve 140, enabling the first warm air to flow into the dehumidifier 150 when the multi-mode cooling system 100 operates in the closed-circuit mode. An inlet of the battery tab chamber 160 is fluidly connected to an outlet of the dehumidifier 150, allowing the second cool air generated by the dehumidifier 150 to flow into the battery tab chamber 160 for cooling the tabs of the batteries. The second inlet 114 of the first three-way valve 110 is fluidly connected to an outlet of the battery tab chamber 160, allowing the second warm air from the battery tab chamber 160 to return to the evaporative cooler 120 via the first three-way valve 110. The second outlet 146 of the second three-way valve 140 is fluidly connected to the surrounding environment, allowing the first warm air from the battery pack chamber 130 to be discharged directly to the environment in the open-circuit mode. These fluid connections establish the pathways necessary for both operational modes of the multi-mode cooling system 100.

Herein, in the multi-mode cooling system 100, the evaporative cooler 120 is configured to receive the second warm air from the battery tab chamber 160 via the first three-way valve 110 when the second inlet 114 of the first three-way valve 110 is open. This configuration enables the closed-circuit operation, where the air continuously circulates through the system components. The dehumidifier 150 is configured to receive the first warm air from the battery pack chamber 130 via the second three-way valve 140 when the first outlet 144 of the second three-way valve 140 is open. This arrangement allows the warm, humid air from the battery pack chamber 130 to be processed by the dehumidifier 150, preparing it for subsequent cooling applications. The routing of air through these components is controlled by the open/closed states of the first three-way valve 110 and the second three-way valve 140, which determine the active operational mode of the multi-mode cooling system 100.

In the closed-circuit mode, the first three-way valve 110, the evaporative cooler 120, the battery pack chamber 130, the second three-way valve 140, the dehumidifier 150, and the battery tab chamber 160 are configured to define a closed circuit for the refrigerant to circulate within. This circuit is established when the first inlet 112 of the first three-way valve 110 is closed, the second inlet 114 of the first three-way valve 110 is open, the outlet 116 of the first three-way valve 110 is open, the inlet 142 of the second three-way valve 140 is open, the first outlet 144 of the second three-way valve 140 is open, and the second outlet 146 of the second three-way valve 140 is closed. This valve configuration creates a closed loop that enables continuous circulation of the refrigerant through the system components. The closed-circuit mode is particularly implemented during active vehicle operation, as it allows for efficient battery cooling without continuous water consumption, since the water evaporated in the evaporative cooler 120 is recaptured in the dehumidifier 150.

Alternatively, the evaporative cooler 120 is configured to receive the air from the surrounding environment via the first three-way valve 110 when the first inlet 112 of the first three-way valve 110 is open. This configuration enables the open-circuit operation, where fresh air is drawn from the environment, cooled, and then discharged back to the environment after use. The battery pack chamber 130 is configured to discharge the first warm air into the surrounding environment via the second three-way valve 140 when the second outlet 146 of the second three-way valve 140 is open. This arrangement allows the warm air that has absorbed heat from the batteries to be expelled from the multi-mode cooling system 100, enabling the open circuit. The routing of air through these components in the open-circuit mode is controlled by the open/closed states of the first three-way valve 110 and the second three-way valve 140, which are set to create an open path from the environment and back.

In the open-circuit mode, the first three-way valve 110, the evaporative cooler 120, the battery pack chamber 130, and the second three-way valve 140 are configured to define an open circuit for the refrigerant to pass through. This circuit is established when the first inlet 112 of the first three-way valve 110 is open, the second inlet 114 of the first three-way valve 110 is closed, the outlet 116 of the first three-way valve 110 is open, the inlet 142 of the second three-way valve 140 is open, the first outlet 144 of the second three-way valve 140 is closed, and the second outlet 146 of the second three-way valve 140 is open. This valve configuration creates an open path that allows fresh air from the environment to be processed for cooling and then discharged back to the environment after use. The open-circuit mode is particularly implemented during vehicle parking, as it requires little or no electrical energy and can operate semi-passively to maintain battery temperatures within acceptable limits. This mode does consume water for the evaporative cooling process, but the rate of consumption is relatively low, allowing for extended operation with a reasonably sized water reservoir.

In embodiments of the present disclosure, the multi-mode cooling system 100 also includes a controller (e.g. 700 in FIG. 7) configured to switch on the closed-circuit mode of the multi-mode cooling system 100 by closing the first inlet 112 of the first three-way valve 110 and the second outlet 146 of the second three-way valve 140 and opening the second inlet 114 of the first three-way valve 110, the outlet 116 of the first three-way valve 110, the inlet 142 of the second three-way valve 140, and the first outlet 144 of the second three-way valve 140. The controller manages the valve states to establish the appropriate flow paths for the closed-circuit mode. The controller can be integrated with a main control system of the vehicle, receiving inputs from various sensors to determine the desirable operation mode based on current conditions. The controller is configured to switch on the closed-circuit mode of the multi-mode cooling system 100 when a vehicle including the multi-mode cooling system 100 is in operation. This automation ensures that the multi-mode cooling system 100 operates in an efficient mode for the current vehicle status, improving battery cooling while reducing energy and water consumption.

Similarly, the controller is configured to switch on the open-circuit mode by closing the second inlet 114 of the first three-way valve 110 and the first outlet 144 of the second three-way valve 140 and opening the first inlet 112 of the first three-way valve 110, the outlet 116 of the first three-way valve 110, the inlet 142 of the second three-way valve 140, and the second outlet 146 of the second three-way valve 140. The controller manages the valve states to establish the appropriate flow paths for the open-circuit mode. The controller is configured to switch on the open-circuit mode of the multi-mode cooling system 100 when a vehicle including the multi-mode cooling system 100 is at rest. This automation ensures that the multi-mode cooling system 100 transitions to the energy-efficient open-circuit mode during parking, maintaining battery temperatures within acceptable limits while reducing battery power consumption.

For purposes of the present disclosure, the controller may include sensors to monitor battery temperature, ambient conditions, and vehicle operational status, using this information to determine which mode of operation for the multi-mode cooling system 100 to switch on. The details about software and hardware implementations of the controller of the multi-mode cooling system 100 are discussed later in detail in reference to FIGS. 7-10.

Figure 2:
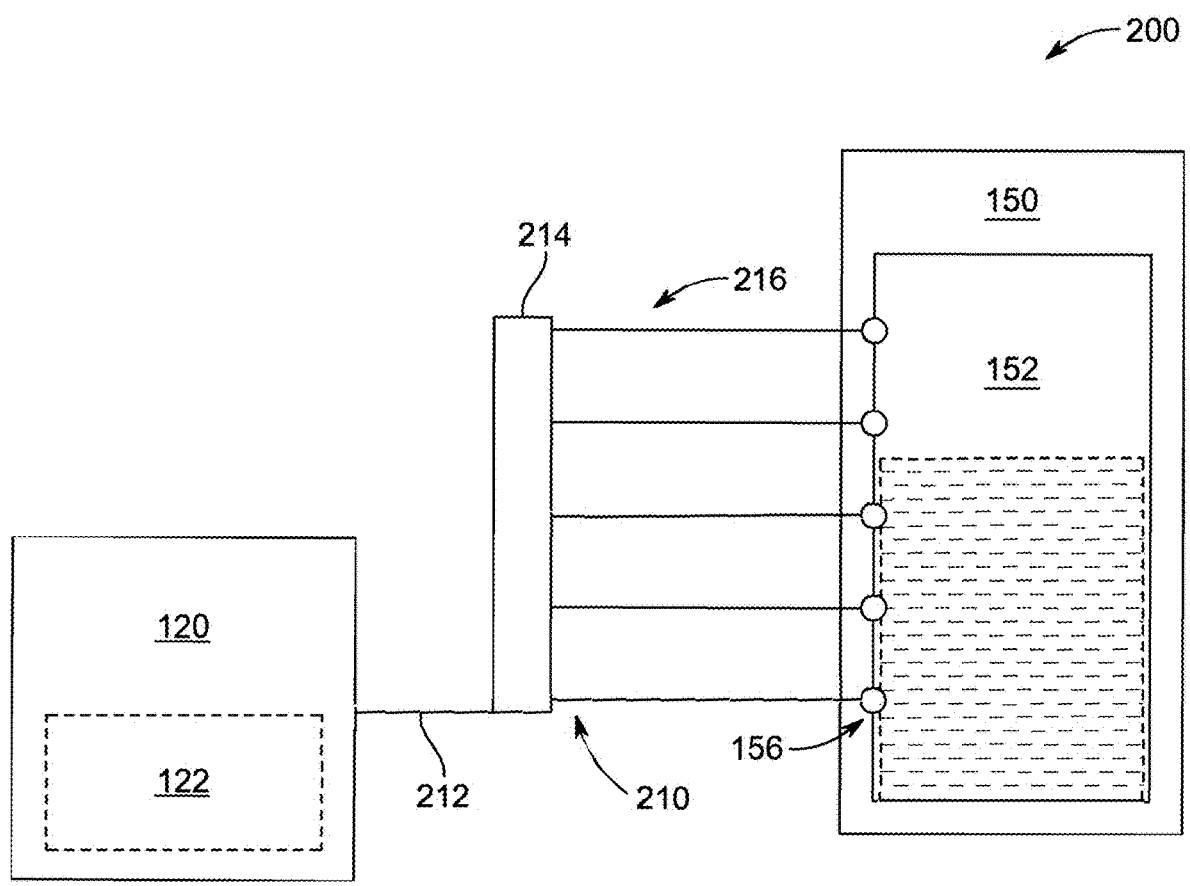
FIG. 2 is a schematic diagram of a water level control system of the multi-mode cooling system, showing a conduit with an inlet manifold and a plurality of pipes connected to holes in a dehumidifier, according to certain embodiments.

Referring to FIG. 2, illustrated is a schematic diagram of a water level control system 200 for the multi-mode cooling system 100, according to certain embodiments. The water level control system 200 includes a conduit 210 connecting the evaporative cooler 120 and the dehumidifier 150. The conduit 210 is configured to transfer a portion of the volume of water from the dehumidifier 150 to the evaporative cooler 120. The conduit 210 includes an outlet 212 connected to the evaporative cooler 120, an inlet manifold 214, and a plurality of pipes 216 extending from the inlet manifold 214. The outlet 212 of the conduit 210 delivers water to the water reservoir 122 of the evaporative cooler 120, replenishing the water consumed during the evaporative cooling process. The inlet manifold 214 collects water from the multiple pipes 216 and directs it towards the outlet 212, ensuring a steady supply of water to the evaporative cooler 120. The plurality of pipes 216 extending from the inlet manifold 214 connect to the dehumidifier 150 at different heights, allowing for water collection from different levels within the dehumidifying chamber 152.

The dehumidifier 150 includes a plurality of holes 156 aligned in a vertical direction of a sidewall structure of the dehumidifying chamber 152. These holes 156 are positioned at different heights along the sidewall of the dehumidifying chamber 152, creating a gradient of potential water outlets. Each pipe of the conduit 210 is connected to a respective hole of the dehumidifier 150, establishing direct fluid connections between the dehumidifying chamber 152 and the inlet manifold 214. The holes 156 and pipes 216 are arranged such that water can flow from the dehumidifying chamber 152 to the water reservoir 122 of the evaporative cooler 120 without requiring pumps or active control systems. This gravity-driven water transfer system simplifies the design and reduces the energy consumption of the multi-mode cooling system 100.

Herein, the inlet manifold 214 is configured so that a selected hole of the plurality of holes 156 defines a highest level of the volume of water on the sidewall structure of the dehumidifying chamber 152 and maintains a substantially constant amount of water in the dehumidifier 150 over time. This configuration allows for passive water level control, where the water level in the dehumidifying chamber 152 reaches an equilibrium at the height of the selected hole. When the water level rises above this point, excess water flows through the selected hole, through the corresponding pipe, into the inlet manifold 214, and ultimately to the water reservoir 122 of the evaporative cooler 120. This self-regulating mechanism ensures that the dehumidifier 150 maintains a constant water level for efficient operation without requiring sensors or active control systems. A hole can be selected by operating the manifold 214 to open a respective pipe and close other pipes. Alternatively or additionally, a hole can be selected by closing other holes with door structures installed on sidewall structure of the dehumidifying chamber 152. The selection of which hole serves as the highest active water level can be adjusted based on the specific operating conditions and requirements of the multi-mode cooling system 100.

The proposed water level control system 200 ensures that water circulates efficiently between the dehumidifier 150 and the evaporative cooler 120 in the closed-circuit mode of the multi-mode cooling system 100. The gravity-driven design eliminates the energy requirements of the water circulation process by additional sensors and controlling units, aligning with the overall energy efficiency goals of the multi-mode cooling system 100. The constant water level maintained in the dehumidifier 150 facilitates consistent dehumidification performance, enhancing the overall cooling efficiency of the multi-mode cooling system 100. The multiple holes 156 at different heights provide flexibility in system operation, allowing for adjustments based on performance requirements and operating conditions. This passive water management approach contributes to the reliability and robustness of the multi-mode cooling system 100, reducing the likelihood of component failures and reducing maintenance requirements.

Figure 3:
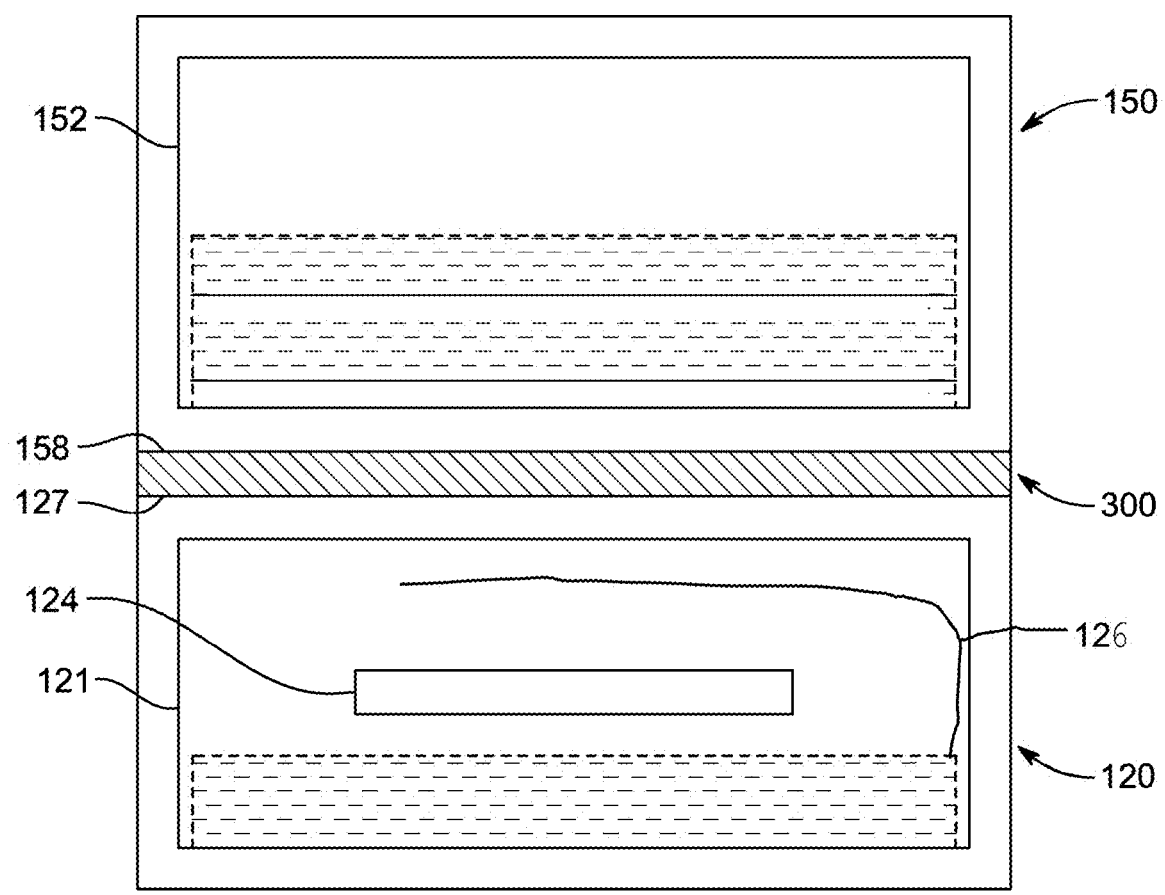
FIG. 3 is a cross-sectional view showing a shared structure in the multi-mode cooling system, where a bottom of a dehumidifying chamber forms a top of an evaporative cooling chamber, according to certain embodiments.

Referring to FIG. 3, illustrated is a cross-sectional view of a thermal connection 300 between the dehumidifier 150 and the evaporative cooler 120, according to certain embodiments. In this configuration, the evaporative cooler 120 includes an evaporative cooling chamber 121, where a bottom structure 158 of the dehumidifying chamber 152 forms a top structure 127 of the evaporative cooling chamber 121 of the evaporative cooler 120. This shared structural element creates a direct thermal connection between the dehumidifier 150 and the evaporative cooler 120, facilitating heat transfer between these components. The bottom structure 158 of the dehumidifying chamber 152 and the top structure 127 of the evaporative cooling chamber 121 are constructed from a thermally conductive material, allowing for efficient heat exchange between the water in the dehumidifying chamber 152 and the air in the evaporative cooling chamber 121.

The thermal connection 300 enables heat to flow from the warmer component to the cooler component, helping to maintain more uniform temperatures throughout the multi-mode cooling system 100. This design enhances the overall thermal efficiency of the multi-mode cooling system 100 by utilizing the temperature difference between the dehumidifying chamber 152 and the evaporative cooling chamber 121. This can be particularly beneficial for battery cooling, as it contributes to more consistent temperature regulation for both the main bodies and the tabs of the batteries. The shared structure simplifies the overall design of the multi-mode cooling system 100, reducing the number of components and potential points of failure. The thermal connection 300 operates passively, requiring no additional energy input, which aligns with the energy efficiency goals of the multi-mode cooling system 100.

In some embodiments, the multi-mode cooling system 100 is switched from the closed-circuit mode to the open-circuit mode when the vehicle is parked. As discussed earlier, the dehumidifier 150 can be connected to the air conditioning system of the vehicle via the coolant line 154, so the dehumidifier 150 is at a temperature lower than that of an ambient temperature immediately after the vehicle is parked. As a result, the evaporative cooler 120 can leverage the dehumidifier 150 as a cooling source via the thermal connection 300 at least during an initial stage after parking. While not shown, it should be understood that the conduit 210 and the holes 156 in FIG. 2 can be implemented in FIG. 3 as well.

Figure 4A:
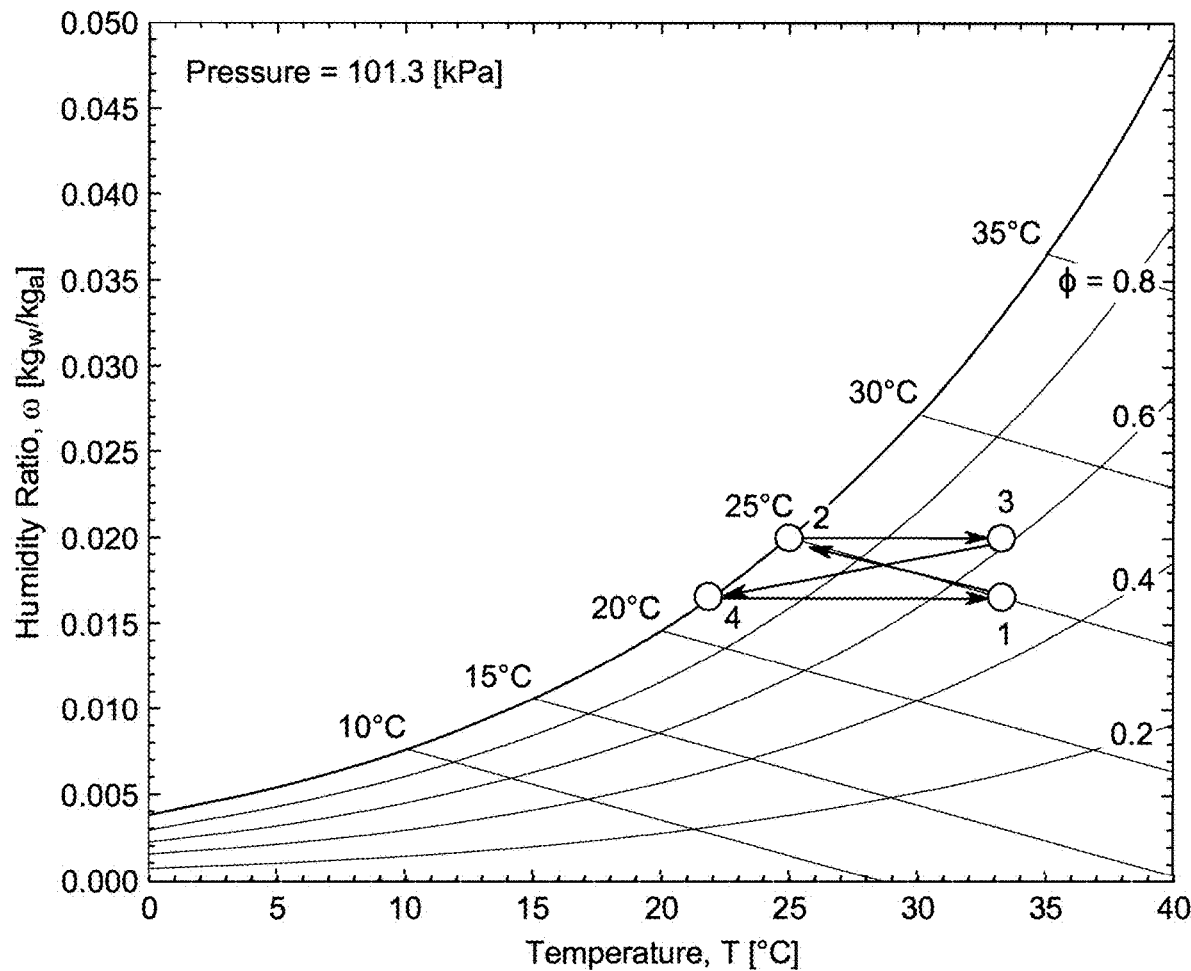
FIG. 4A is an exemplary graph of a processes of the multi-mode cooling system in a closed-circuit mode, according to certain embodiments.

Referring now to FIG. 4A, illustrated is a graph representative of a process of the multi-mode cooling system 100 operating in the closed-circuit mode, according to certain embodiments. In this mode, the hot and relatively dry air at state '1' enters the evaporative cooler 120 to be cooled and humidified to a relative humidity of 100% at state '2'. The cold-humid air absorbs the heat generation in the batteries by direct contact with the batteries in the battery pack chamber 130 at state '3', which represents the heat transfer between the batteries and the humid air. Then, the heat carried by the humid air is rejected in the dehumidifier 150, resulting in colder air with a relative humidity of 100% at state '4'. The cold-humid air (in state '4') enters the battery tab chamber 160 to absorb additional heat from the batteries at tabs of the batteries. This means that heat is removed from both the battery main bodies and the tabs, ensuring a uniform temperature distribution inside and along the battery. Then, the dehumidifier 150, in turn, rejected the heat to the coolant coming from the air condition system of the vehicle.

A notable benefit of the closed-circuit mode is the elimination of water consumption. The water consumed by the evaporative cooler 120 is condensed and recycled within the dehumidifier 150, creating a closed-loop system for water. This recycling process is facilitated by the water level control system 200, which transfers water from the dehumidifier 150 to the evaporative cooler 120 as needed. The closed-circuit mode is particularly useful during active vehicle operation, when the air conditioning system of the vehicle is available to provide cooling for the dehumidifier 150. This mode provides efficient battery cooling without depleting the water supply, making it suitable for extended driving periods. The closed-circuit operation also reduces interaction of the multi-mode cooling system 100 with the external environment, reducing the impact of varying ambient conditions on cooling performance.

Figure 4B:
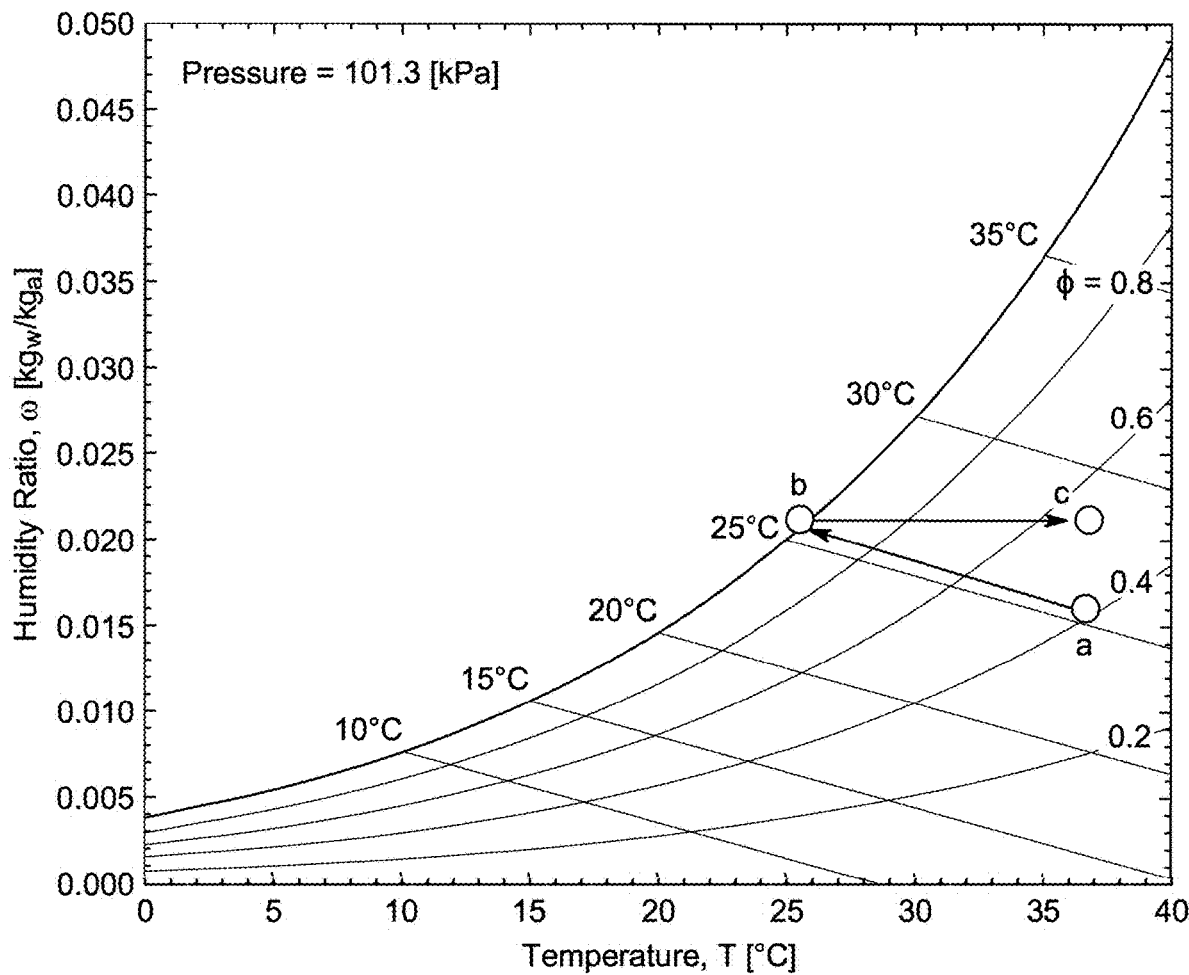
FIG. 4B is an exemplary graph of a processes of the multi-mode cooling system in an open-circuit mode, according to certain embodiments.

Referring to FIG. 4B, illustrated is a graph representative of a processes of the multi-mode cooling system 100 operating in the open-circuit mode, according to certain embodiments. In this operational mode, ambient air (e.g. ambient dry air) is drawn into the evaporative cooler 120 through the first three-way valve 110 at state 'a'. After contact with the evaporative pad 124 of the evaporative cooler 120, the air is humidified and cooled at state 'b'. This chilled-humid air is then directed over the battery pack in the battery pack chamber 130, where it absorbs excess heat coming from external sources at state 'c'. The now warmed air is subsequently expelled back into the ambient environment through the second three-way valve 140. Water consumption is necessary in this mode to sustain the humidification process within the evaporative cooler 120.

The open-circuit mode is particularly useful during vehicle parking, when the air conditioning system of the vehicle is not operational to provide cooling for the dehumidifier 150. This mode provides an effective solution for maintaining battery temperatures within acceptable limits during extended parking periods, with little or no electrical energy consumption. Although water is consumed in this mode, the rate of consumption is relatively low, allowing for sufficiently long operation with a reasonably sized water reservoir. The open-circuit operation leverages the natural cooling potential of evaporation, which is particularly effective in dry environments. Such adaptability of the multi-mode cooling system 100 provides an energy-efficient cooling solution for the specific challenges of battery temperature management during vehicle parking.

Figure 5:
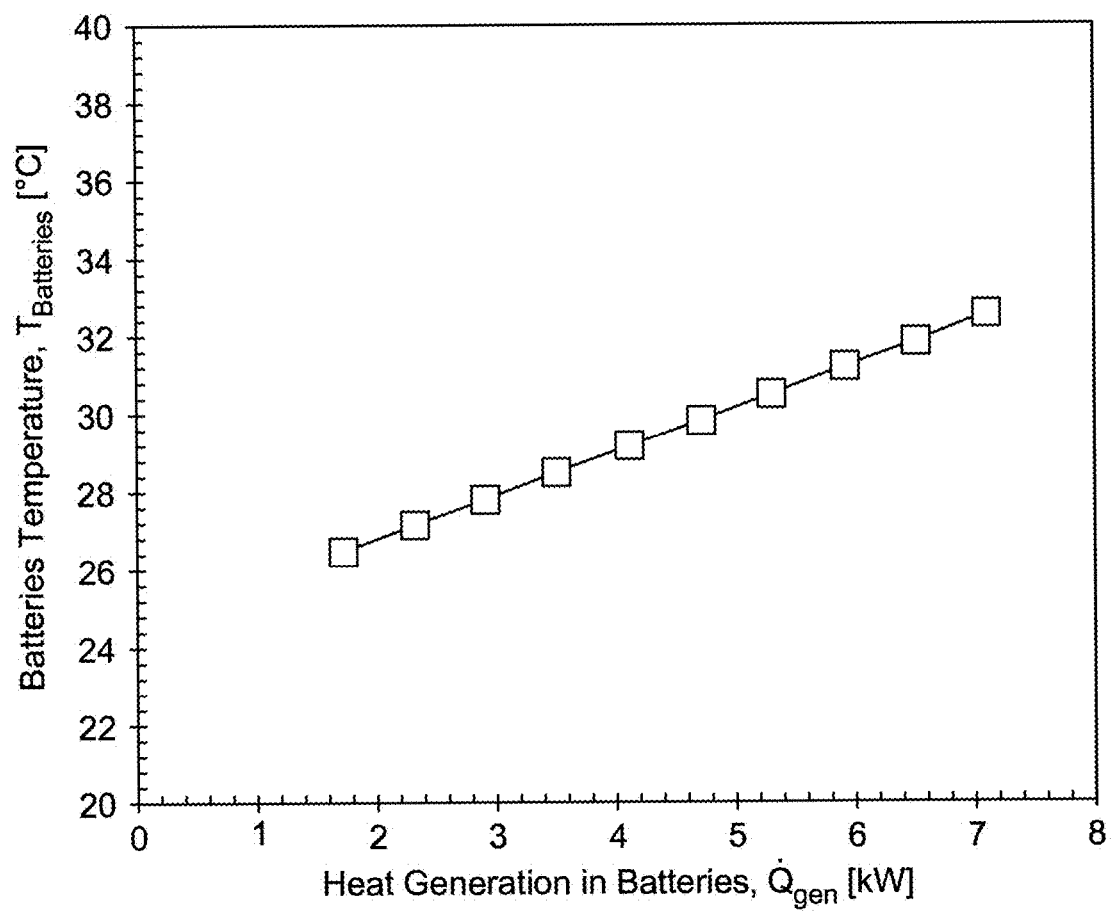
FIG. 5 is an exemplary graph showing battery temperature as a function of heat generation during closed-circuit mode operation, according to certain embodiments.

Referring to FIG. 5, illustrated is a graph showing the battery temperature as regulated by the multi-mode cooling system 100 versus the heat generated within the batteries, according to certain embodiments. The graph represents the performance of the multi-mode cooling system 100 operating in closed-circuit mode, under worst-case scenario conditions. The rate of heat generation in a standard 18650 lithium-ion battery cell typically ranges from 0.24 to 1 W [Wu C et al. (2023) *Experimental and numerical studies on lithium-ion battery heat generation behaviors. Energy Reports* 9:5064-5074]. Given that an electric vehicle such as the Tesla Model S utilizes 7,104 of these cells, the total heat dissipation within battery pack of the vehicle can vary from approximately 1.7 kW to 7.1 kW. This heat generation is a direct consequence of the electrochemical processes occurring within the battery cells during discharge. Additionally, heat transfer from the external environment due to high ambient temperature is considered, approximated at 0.5 kW [Grundstein A, Meentemeyer V, Dowd J (2009) *Maximum vehicle cabin temperatures under different meteorological conditions. Int. J. Biometeorol.* 53(3):255-261].

The performance analysis of the multi-mode cooling system 100 in the closed-circuit mode considers several input parameters and boundary conditions, which are summarized in Table 1 below:

TABLE 1

The input parameters for the closed-loop mode

| Parameter | Value | Unit |
|---|---|---|
| Operational pressure, P | 101 | kPa |
| Dry air mass flow rate, $\dot{m}_{da}$ | 0.5 | kg/s |
| Heat generation in batteries, $\dot{Q}_{gen}$ | 1.7-7.1 | kW |
| Heat transfer from outside, $\dot{Q}_{ab}$ | 0.5 | kW |
| Temperature of bubble column, $T_w$ | 20 | ° C. |

As shown in the graph, despite the worst-case scenario being considered, the temperature of the batteries is maintained within the acceptable range (i.e., less than 45° C.) across the entire range of heat generation rates. This demonstrates the effectiveness of the multi-mode cooling system 100 in managing battery temperatures even under extreme operating conditions. The graph indicates a gradual increase in battery temperature as heat generation increases, which is expected, but the rate of increase is controlled, and the temperature remains within safe limits. This controlled temperature rise is a result of the efficient heat removal capabilities of the multi-mode cooling system 100, which utilizes evaporative cooling and direct air contact to enhance heat transfer from the batteries.

Thus, the multi-mode cooling system 100 can be improved further to reduce the capacity load on the air conditioning system of the car. For the Tesla Model S, the battery capacity is about 75 kWh [Xu B, Arjmandzadeh Z (2023) *Parametric study on thermal management system for the range of full (Tesla Model S)/compact-size (Tesla Model 3) electric vehicles. Energy Convers. Manag.* 278:116753]. Considering the coefficient of performance of the air conditioning system of the car as 3.5 [AlahmerA (2016) *Thermal analysis of a direct evaporative cooling system enhancement with desiccant dehumidification for vehicular air conditioning. Appl. Therm. Eng.* 98:1273-1285], the cooling load imposed on the air conditioning can be estimated at around 7.2 kWh, representing approximately 10% of the total battery capacity. To mitigate potential temperature increases in the battery during periods of low battery charge, the multi-mode cooling system 100 can transition to the open-circuit mode.

Figure 6:
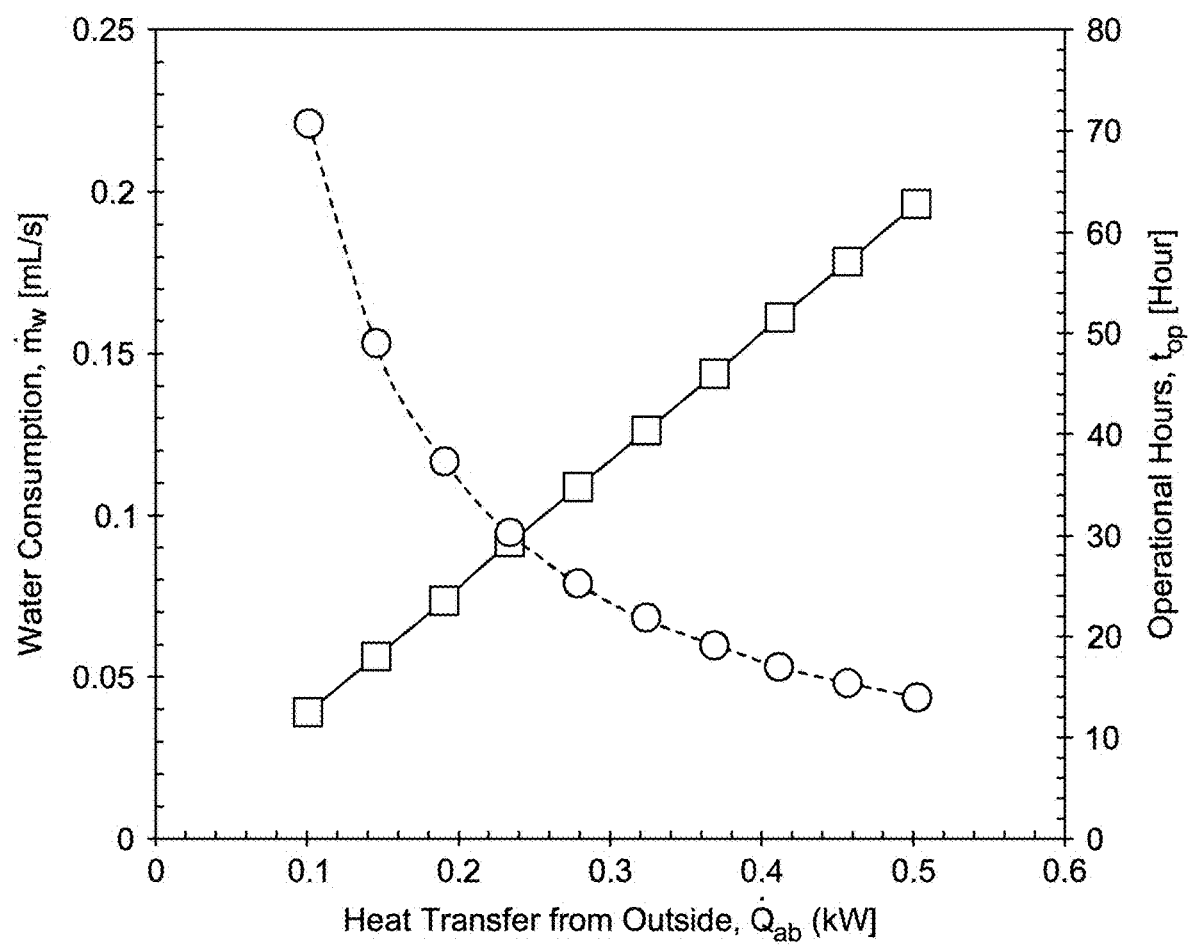
FIG. 6 is an exemplary graph showing water consumption and operating time as a function of heat transfer from ambient during open-circuit mode operation, according to certain embodiments.

Referring to FIG. 6, illustrated is a graph showing the water consumption and operating time of the multi-mode cooling system 100 operating in the open-circuit mode, according to certain embodiments. The graph illustrates the relationship between water consumption and the amount of radiant heat absorbed by the vehicle cabin, as well as the operating time before water depletion from a 10-liter water tank as a function of radiant heat absorption. The results indicate a direct correlation, with higher water consumption corresponding to increased radiant heat absorption. This is consistent with the expected behavior of a cooling system that requires more water to maintain a constant battery temperature of 40° C. under greater heat loads.

The open-circuit mode is particularly advantageous when the vehicle remains stationary for extended periods. In such scenarios, the absence of battery-related heat generation means that the majority of temperature increases within the battery compartment are primarily attributed to radiant heat absorbed by the cabin of the vehicle. Irrespective of external weather conditions, the multi-mode cooling system 100 operates in a manner that ensures a consistent battery temperature, namely 40° C. The system's fresh air intake occurs at a temperature of 38° C. and relative humidity of 40%. The water tank in the proposed system has a capacity of 10 liters. Table 2 summarizes the operating conditions for the open-circuit mode:

TABLE 2

The input parameters for the open-loop mode.

| Parameter | Value | Unit |
| --- | --- | --- |
| Operational pressure, P | 101 | kPa |
| Fresh air temperature, $T_{amb}$ | 38 | ° C. |
| Fresh air relative humidity, $\varnothing_{amb}$ | 40 | % |
| Heat generation in batteries, $\dot{Q}_{gen}$ | 0 | kW |
| Heat transfer from outside, $\dot{Q}_{ab}$ | 0.1–0.5 | kW |
| Temperature of bubble column, $T_w$ | 40 | ° C. |

As shown in FIG. 6, under the most extreme scenario with a radiant heat absorption of 0.5 kW, the operating time before water depletion is approximately 14 hours. Considering that a vehicle cabin may experience an average of 7 hours of sunlight exposure daily, with peak sun hours typically ranging around 3 hours, a 10-liter water tank can provide cooling for more than 4 days before requiring replenishment. This extended operating time demonstrates the practicality of the open-circuit mode for maintaining battery temperatures during parking, even in hot environments with significant solar radiation. The water consumption rate is manageable, allowing for reasonable intervals between water refills.

The multi-mode cooling system 100 of the present disclosure was also evaluated using a mathematical model to assess the performance under different operating conditions. The mathematical model is based on the following assumptions: (1) steady-state operational conditions are considered; (2) heat transfer to the battery pack chamber from the external environment was considered, while other heat exchanges with the surroundings were assumed to be negligible; (3) kinetic and potential energy variations are neglected; (4) the humid air composed of dry air and water vapor is treated as an ideal gas mixture; (5) the pressure drop inside the evaporative cooler is neglected; and (6) the relative humidity at the exit of the evaporator and the bubble column dehumidifier is 100%.

The mass balance for the moist air in the evaporative cooler and the bubble dehumidifier can be expressed as:

$$\dot{m}_w = \dot{m}_{da}(\omega_2 - \omega_1) = \dot{m}_{da}(\omega_3 - \omega_4) \tag{1}$$

where $\dot{m}_W$ is the mass flow rate of the water supplied by the bubble dehumidifier or the mass consumed by the evaporative cooler and $\dot{m}_{da}$ is the mass flow rate of the dry air. $\omega_1$, $\omega_2$, $\omega_3$ and $\omega_4$ are humidity ratios at states 1, 2, 3 and 4 respectively in FIG. 4A. Each humidity ratio $\omega$ of $\omega_1$, $\omega_2$, $\omega_3$ and $\omega_4$ can be calculated using:

$$\omega = \frac{0.622 P_v}{P - P_v} \tag{2}$$

where P and $P_v$ are the total pressure and the partial pressure of the water vapor, respectively. The partial pressure of the water vapor $P_v$ can be determined as a function of the relative humidity $\phi$ as follows:

$$\phi = \frac{P_v}{P_g} \tag{3}$$

where $P_g$ is the saturated pressure corresponding to the moist air temperature.

The energy balance for the evaporative cooler can be expressed as:

$$0 = h_1 + (\omega_2 - \omega_1) h_w - h_2 \tag{4}$$

where $h_i$ stands for the enthalpy of the moist air or water. $h_1$, $h_2$, $h_3$ and $h_4$ are the enthalpy of the moist air at states 1, 2, 3 and 4 respectively in FIG. 4A. $h_w$ is the enthalpy of water. When the cold-humid air enters the batteries' pack chamber, it absorbs the heat $\dot{Q}_{abs,1}$ from the batteries at a rate of:

$$\dot{Q}_{abs,1} = \dot{m}_{da}(h_3 - h_2) \tag{5}$$

Similarly, the cold-humid air at state 4 enters the battery tab chamber to absorb heat $\dot{Q}_{abs,2}$ as follows:

$$\dot{Q}_{abs,2} = \dot{m}_{da}(h_1 - h_4) \tag{6}$$

The refrigeration capacity $\dot{Q}_c$ required in bubble column dehumidifier from the car AC system can be determined by applying the energy balance as:

$$\dot{Q}_c = \dot{m}_c(h_{c,out} - h_{c,in}) = \dot{m}_{da}[(h_3 - h_4) - (\omega_3 - \omega_4) h_w] = \dot{Q}_{abs,1} + \dot{Q}_{abs,2} \tag{7}$$

where the subscript c stands for the coolant that comes from the car AC system. Finally, the net heat absorbed is equivalent to the sum of the heat generated within the batteries $\dot{Q}_{gen}$ and the heat transferred from the external environment $\dot{Q}_{ab}$.

The mathematical model developed for the multi-mode cooling system 100 was solved using the Engineering Equation Solver (EES) software. EES is a known tool for solving complex equations and includes built-in data for various working fluids, including those used in the multi-mode cooling system 100 (moist air and water). Thus, all the thermodynamic properties are obtained from the software.

The multi-mode cooling system 100, as described and analyzed above, provides several advantages over conventional battery thermal management systems. The multi-mode cooling system 100 provides a hybrid evaporative cooling approach that can operate actively during driving to evacuate the heat generation in the batteries, and also work semi-passively during parking to maintain the battery pack temperature within the acceptable range. The dual-mode operation of the multi-mode cooling system 100 addresses both active and passive cooling needs, providing a thermal management solution for electric vehicle batteries. The multi-mode cooling system 100 enables significant weight and cost reduction compared to liquid cooling systems, while facilitating enhanced heat transfer through direct contact of humid air with the battery surface.

Furthermore, the multi-mode cooling system 100 operates as a highly efficient and environmentally friendly air conditioning solution. The adaptability of the multi-mode cooling system 100 to varying ambient conditions allows for automatic adjustment of cooling capacity to maintain battery performance, making it well-suited for diverse operating environments. The elimination of concerns related to short circuits is another benefit of the multi-mode cooling system 100, as it avoids direct contact between liquid coolants and electrical components. Further, in the closed-circuit mode, there is no water consumption since the water evaporated in the evaporative cooler condenses back in the bubble column dehumidifier, contributing to the overall efficiency and sustainability of the system.

The multi-mode cooling system 100 with its dual-mode operation capability, provides a solution for battery thermal management in electric vehicles. The integration of evaporative cooling technology with a switchable circuit configuration enables the multi-mode cooling system 100 to adapt to different operating conditions, offering efficient cooling during both driving and parking. The direct air contact with both the main bodies and the tabs of the batteries ensures uniform temperature distribution, enhancing battery performance and lifespan. The closed-circuit mode eliminates water consumption during driving, while the open-circuit mode offers energy-efficient cooling during parking. These features, combined with the passive water management system and thermal connections between components, result in an efficient battery thermal management solution suitable for diverse environmental conditions.

Figure 7:
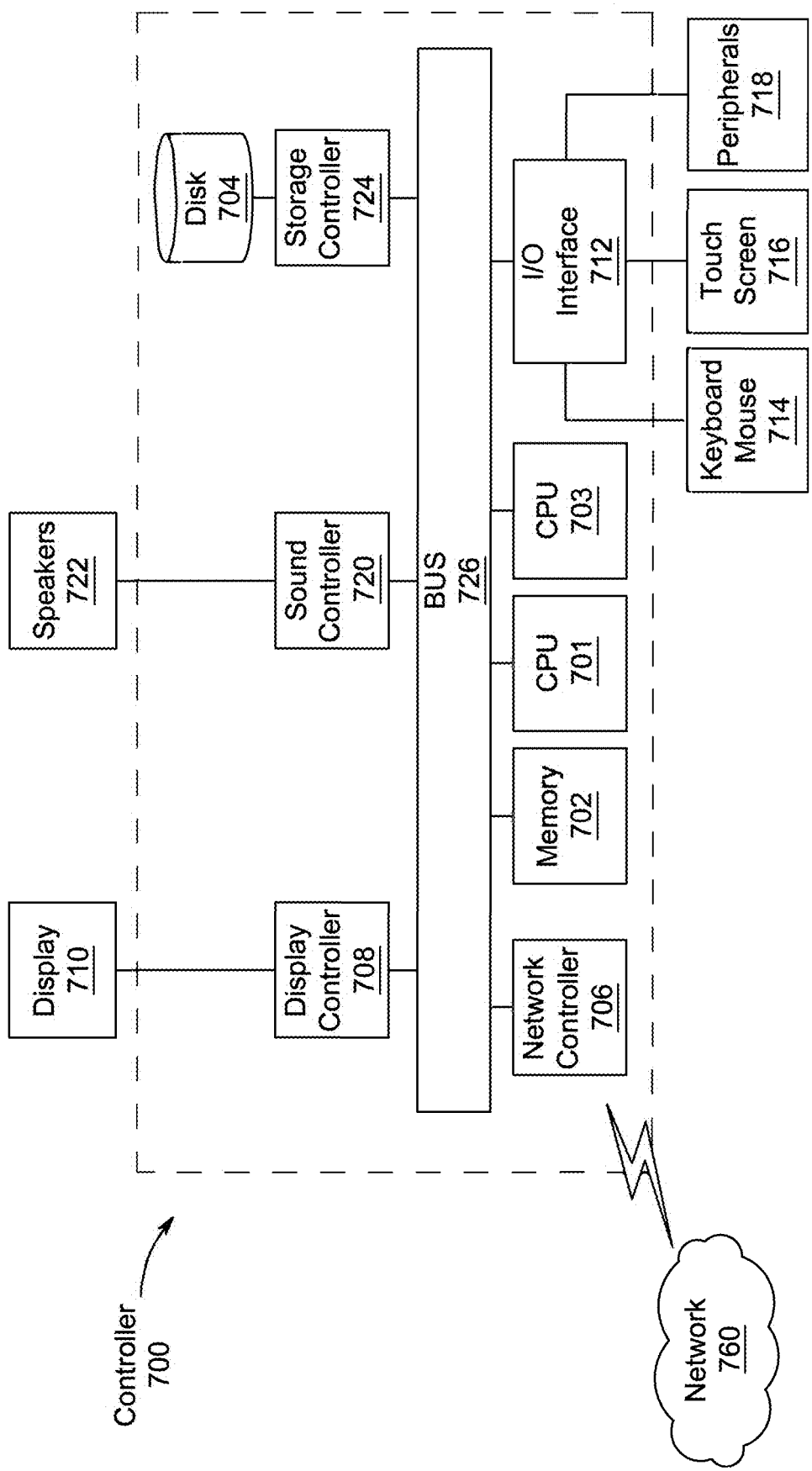
FIG. 7 is an illustration of a non-limiting example of details of computing hardware used in the computing system, according to certain embodiments.

Next, further details of the hardware description of the computing environment according to exemplary embodiments is described with reference to FIG. 7. In FIG. 7, a controller 700 is described embodying the control unit of the system of the present disclosure, in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
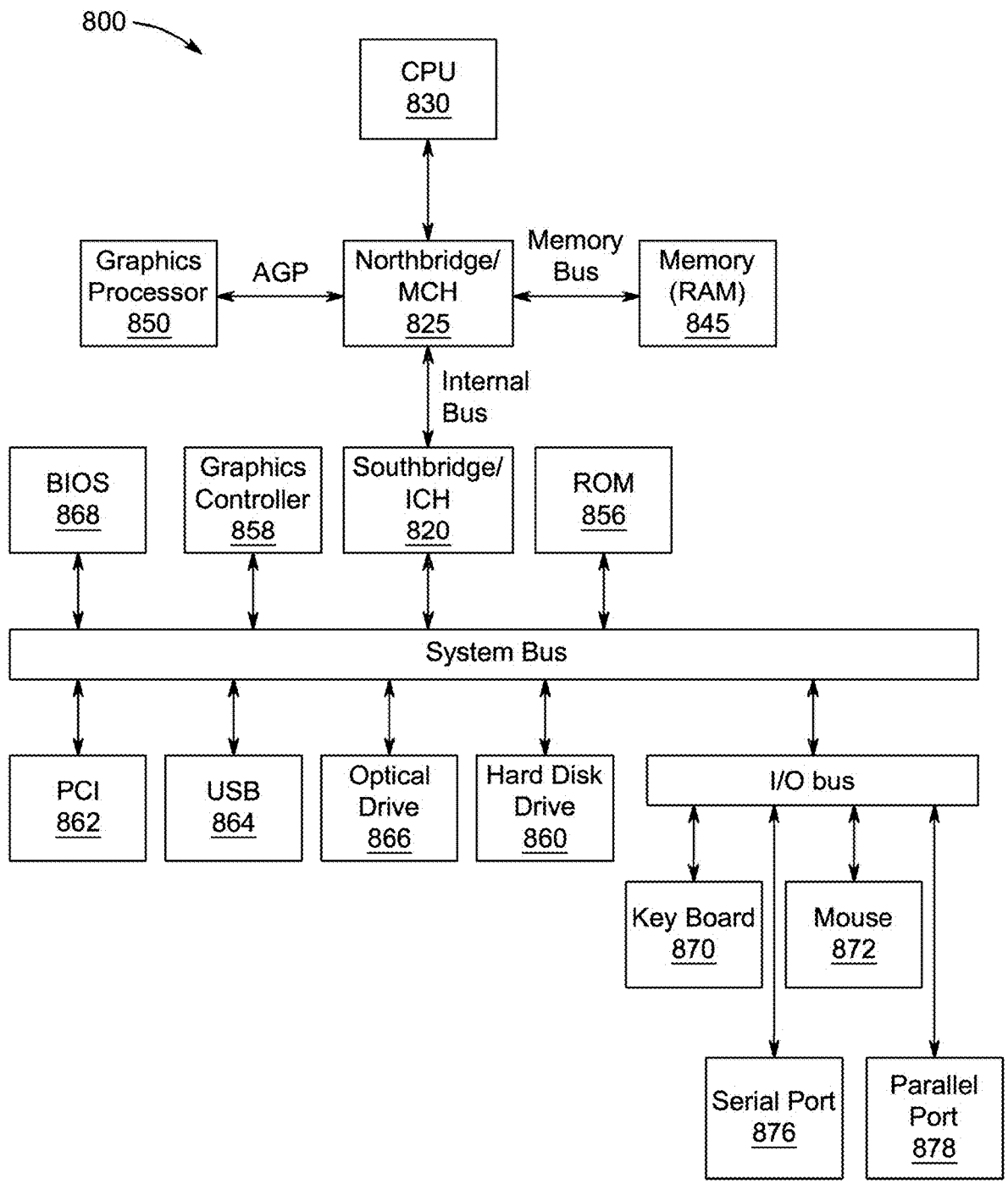
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
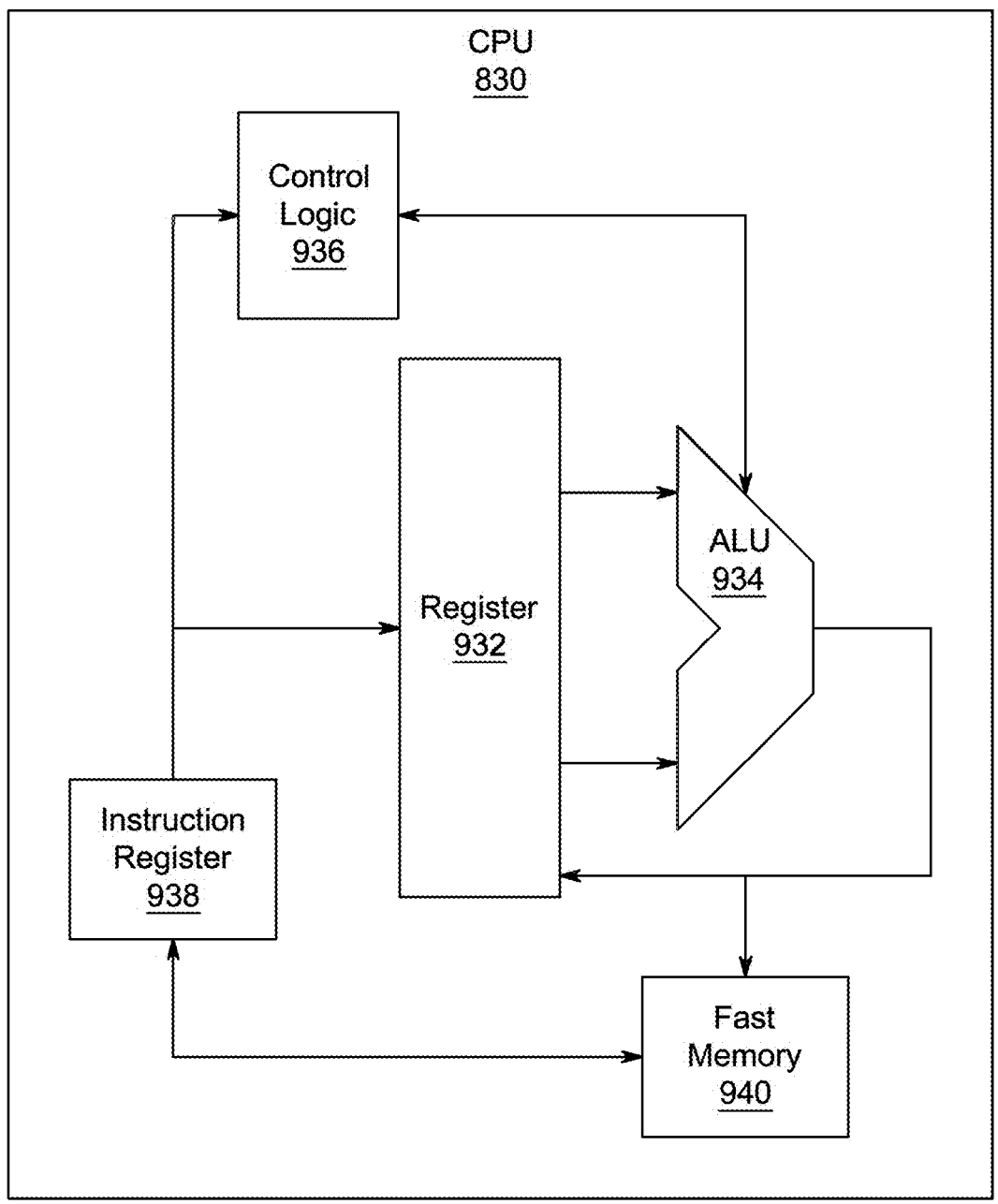
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
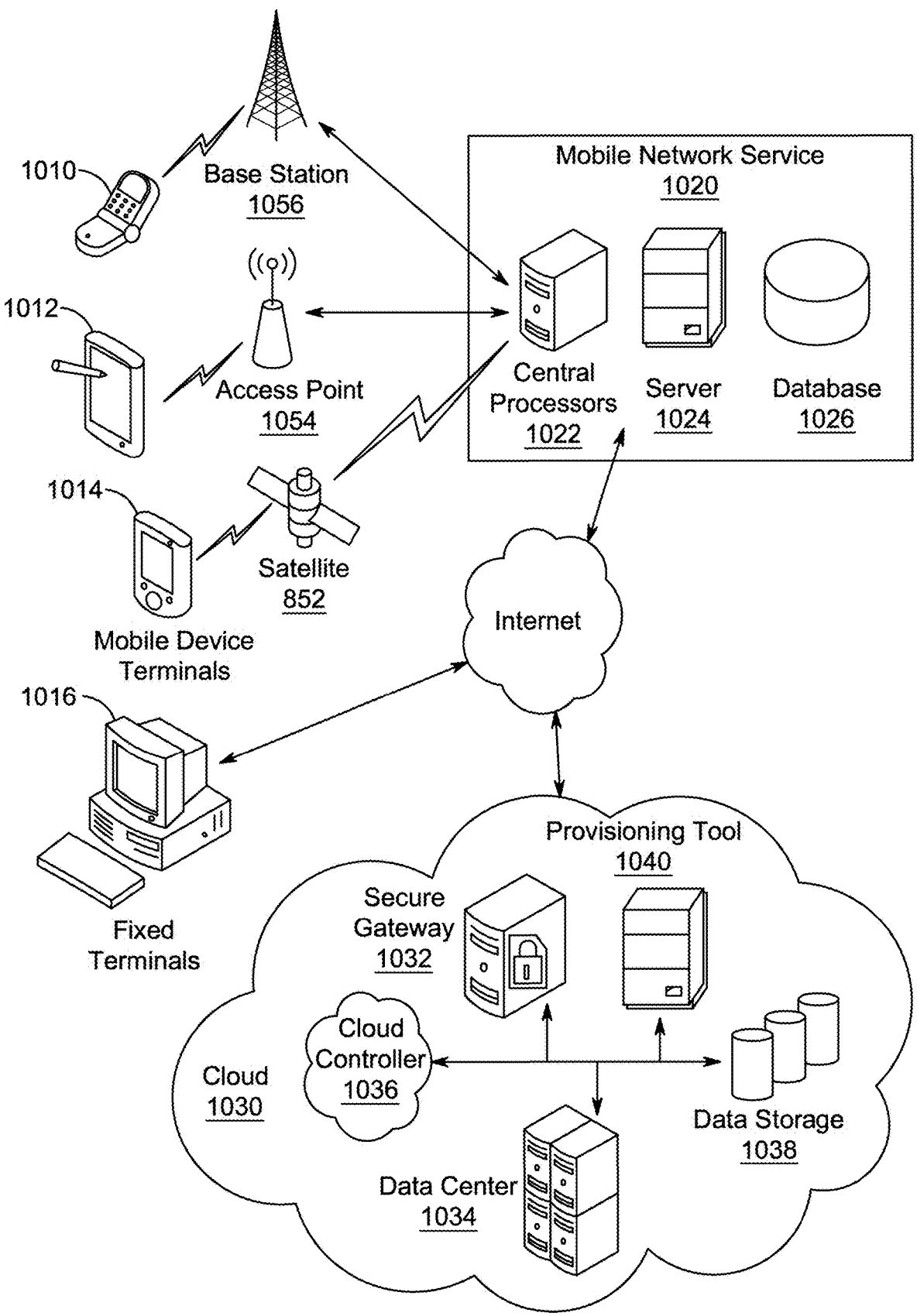
FIG. 10 is an illustration of a non-limiting example of distributed components which may share processing with the controller, according to certain embodiments.

The functions and features described herein may also be executed by various distributed components of a system. For example, one or more processors may execute these system functions. The processors are distributed across multiple components communicating in a network. The distributed components may include one or more client and server machines, such as cloud 1030 including a cloud controller 1036, a secure gateway 1032, a data center 1034, data storage 1038 and a provisioning tool 1040, and mobile network services 1020 including central processors 1022, a server 1024 and a database 1026, which may share processing, as shown by FIG. 10, in addition to various human interface and communication devices (e.g., display monitors 1016, smart phones 1010, tablets 1012, personal digital assistants (PDAs) 1014). The network may be a private network, such as a LAN, satellite 1052 or WAN 1054, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A multi-mode cooling system, comprising:

a first three-way valve having a first inlet configured to receive a refrigerant comprising air from a surrounding environment;

an evaporative cooler;

a battery pack chamber having slots that extend through the battery pack chamber and are configured to receive main bodies of batteries;

a second three-way valve;

a dehumidifier; and a battery tab chamber having slots that extend through the battery tab chamber and are configured to receive tabs of the batteries, wherein the first three-way valve and the second three-way valve are configured such that the multi-mode cooling system has a closed-circuit mode and an open-circuit mode, wherein in the closed-circuit mode, the evaporative cooler is configured to generate a first cool air, the battery pack chamber is configured to receive the first cool air to provide cooling for the main bodies of the batteries and generate a first warm air, the dehumidifier is configured to receive the first warm air and generate a second cool air, the battery tab chamber is configured to receive the second cool air to provide cooling for the tabs of the batteries and generate a second warm air, and the evaporative cooler is configured to receive the second warm air to generate the first cool air, wherein in the open-circuit mode, the evaporative cooler is configured to receive the air and generate a first cool air, the battery pack chamber is configured to receive the first cool air to provide cooling for the main bodies of the batteries and generate the first warm air to be discharged into the surrounding environment.

2. The multi-mode cooling system of claim 1, wherein:

an inlet of the evaporative cooler is fluidly connected to an outlet of the first three-way valve, an inlet of the battery pack chamber is fluidly connected to an outlet of the evaporative cooler, an inlet of the second three-way valve is fluidly connected to an outlet of the battery pack chamber, an inlet of the dehumidifier is fluidly connected to a first outlet of the second three-way valve, an inlet of the battery tab chamber is fluidly connected to an outlet of the dehumidifier, a second inlet of the first three-way valve is fluidly connected to an outlet of the battery tab chamber, and a second outlet of the second three-way valve is fluidly connected to the surrounding environment.

3. The multi-mode cooling system of claim 2, wherein:
the evaporative cooler is configured to receive the second warm air from the battery tab chamber via the first three-way valve when the second inlet of the first three-way valve is open, and
the dehumidifier is configured to receive the first warm air from the battery tab chamber via the second three-way valve when the first outlet of the second three-way valve is open.

4. The multi-mode cooling system of claim 3, wherein in the closed-circuit mode, the first three-way valve, the evaporative cooler, the battery pack chamber, the second three-way valve, the dehumidifier and the battery tab chamber are configured to define a closed circuit for the refrigerant to circulate therein, when:
the first inlet of the first three-way valve is closed, the second inlet of the first three-way valve is open, the outlet of the first three-way valve is open, the inlet of the second three-way valve is open, the first outlet of the second three-way valve is open, and the second outlet of the second three-way valve is closed.

5. The multi-mode cooling system of claim 2, wherein:
the evaporative cooler is configured to receive the air from the surrounding environment via the first three-way valve when the first inlet of the first three-way valve is open, and
the battery tab chamber is configured to discharge the first warm air into the surrounding environment via the second three-way valve when the second outlet of the second three-way valve is open.

6. The multi-mode cooling system of claim 5, wherein in the open-circuit mode, the first three-way valve, the evaporative cooler, the battery pack chamber and the second three-way valve are configured to define an open circuit for the refrigerant to pass through when:
the first inlet of the first three-way valve is open, the second inlet of the first three-way valve is closed, the outlet of the first three-way valve is open, the inlet of the second three-way valve is open, the first outlet of the second three-way valve is closed, and the second outlet of the second three-way valve is open.

7. The multi-mode cooling system of claim 1, wherein the dehumidifier comprises:
a dehumidifying chamber configured to hold a volume of water and receive the first warm air from the battery tab chamber via the second three-way valve, the first warm air comprising moisture; and
a coolant line immersed at least partially in the volume of water and defining a flow path for a coolant to cool the first warm air and condense the moisture.

8. The multi-mode cooling system of claim 7, further comprising:
a conduit connecting the evaporative cooler and the dehumidifier and configured to transfer a portion of the volume of water from the dehumidifier to the evaporative cooler.

9. The multi-mode cooling system of claim 8, wherein:
the conduit comprises:
an outlet connected to the evaporative cooler,
an inlet manifold, and
a plurality of pipes extending from the inlet manifold,
the dehumidifier further comprises a plurality of holes aligned in a vertical direction of a sidewall structure of the dehumidifying chamber, and
each pipe of the conduit is connected to a respective hole of the dehumidifier.

10. The multi-mode cooling system of claim 9, wherein:
the inlet manifold is configured so that a selected hole of the plurality of holes defines a highest level of the volume of water on the sidewall structure of the dehumidifying chamber and maintains a substantially constant amount of water in the dehumidifier over time.

11. The multi-mode cooling system of claim 7, wherein:
the evaporative cooler comprises an evaporative cooling chamber, and
a bottom structure of the dehumidifying chamber forms a top structure of the evaporative cooling chamber.

12. The multi-mode cooling system of claim 11, wherein the evaporative cooler comprises:
a water reservoir configured to hold water;
an evaporative pad positioned above the water reservoir;
a water line configured to provide a portion of the water for the evaporative pad from the water reservoir; and
a fan configured to move the air from one side of the evaporative pad to another side of the evaporative pad.

13. The multi-mode cooling system of claim 12, wherein:
the water line has a first end immersed in the water reservoir and a second end positioned above the water reservoir, and
the evaporative cooler further comprises a pump configured to move the portion of the water from the first end to the second end.

14. The multi-mode cooling system of claim 1, wherein:
each of the slots of the battery pack chamber is aligned with a respective one of the slots of the battery tab chamber.

15. The multi-mode cooling system of claim 1, wherein:
the batteries are lithium-ion batteries of a vehicle.

16. The multi-mode cooling system of claim 15, wherein:
the dehumidifier is a bubble column dehumidifier connected to an air conditioning of the vehicle.

17. The multi-mode cooling system of claim 4, further comprising:
a controller configured to switch on the closed-circuit mode of the multi-mode cooling system by closing the first inlet of the first three-way valve and the second outlet of the second three-way valve and opening the second inlet of the first three-way valve, the outlet of the first three-way valve, the inlet of the second three-way valve and the first outlet of the second three-way valve.

18. The multi-mode cooling system of claim 17, wherein:
the controller is configured to switch on the closed-circuit mode of the multi-mode cooling system when a vehicle comprising the multi-mode cooling system is in operation.

19. The multi-mode cooling system of claim 6, further comprising:
a controller configured to switch on the open-circuit mode by closing the second inlet of the first three-way valve and the first outlet of the second three-way valve and opening the first inlet of the first three-way valve, the outlet of the first three-way valve, the inlet of the second three-way valve and the second outlet of the second three-way valve.

20. The multi-mode cooling system of claim 19, wherein:
the controller is configured to switch on the open-circuit mode of the multi-mode cooling system when a vehicle comprising the multi-mode cooling system is at rest.

\* \* \* \* \*